United States Patent [19]

Grandadam

[11] 3,919,420
[45] Nov. 11, 1975

[54] NOVEL ZOOTECHNICAL COMPOSITIONS
[75] Inventor: Jean André Grandadam, Saint-Maur des Fosses, France
[73] Assignee: Roussel-UCLAF, Paris, France
[22] Filed: Oct. 1, 1974
[21] Appl. No.: 511,097

[30] Foreign Application Priority Data
Oct. 19, 1973 France .............. 73.37344

[52] U.S. Cl. .................. 424/240; 260/343.5
[51] Int. Cl.² .............................. A61K 31/56
[58] Field of Search ....... 424/240; 260/397.5, 343.5

[56] References Cited
UNITED STATES PATENTS
3,449,494  6/1969  Lerner ............................ 424/240
3,636,195  1/1972  Monson .......................... 424/240

Primary Examiner—Elbert L. Roberts
Attorney, Agent, or Firm—Hammond & Littell

[57] ABSTRACT

Novel zootechnical compositions comprising a mixture of an anabolisant steroid of the formula

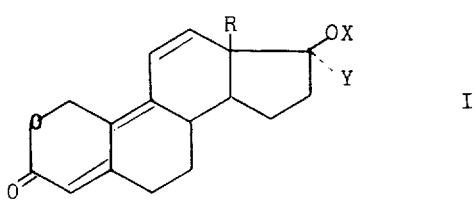

I wherein R is alkyl of 1 to 4 carbon atoms, Y is selected from the group consisting of hydrogen and saturated and unsaturated alkyl of 1 to 4 carbon atoms and X is selected from the group consisting of hydrogen, saturated and unsaturated alkyl of 1 to 6 carbon atoms, one of which may be replaced by an oxygen atom and acyl of an organic carboxylic acid of 1 to 18 carbon atoms and an estrogenic steroid of the formula

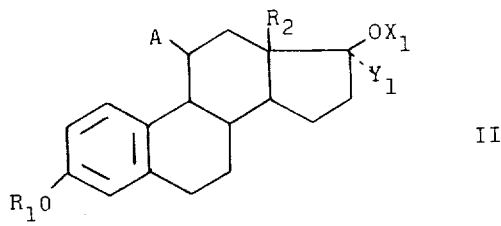

II wherein $R_2$ is alkyl of 1 to 4 carbon atoms, $R_1$ is selected from the group consisting of hydrogen, alkyl of 1 to 5 carbon atoms and cycloalkyl of 3 to 7 carbon atoms, A is selected from the group consisting of hydrogen and alkoxy of 1 to 4 carbon atoms, $X_1$ is selected from the group consisting of hydrogen, alkyl of 1 to 4 carbon atoms, acyl of an organic carboxylic acid of 1 to 10 carbon atoms and aliphatic and cyclanic carbonic acid of 1 to 10 carbon atoms and $Y^1$ is selected from the group consisting of hydrogen, methyl, ethynyl and haloethynyl and to a method of upgrading the meat of domestic animals such as cattle by administering the said compositions under the skin of domestic animals.

9 Claims, No Drawings

NOVEL ZOOTECHNICAL COMPOSITIONS

STATE OF THE ART

German Pat. No. 1,047,596 describes cattle feed containing an estrogenic compound and testosterone or a testosterone derivative (essentially androgenic products). Canadian Pat. No. 889,253 describes compositions for the breeding of pigs based on methyltestosterone and diethylstilbestrol which are susceptible of leaving hormonal substances in organs of the animals notably diethylstilbestrol whose digestive metabolism is complex and whose elimination is slow. For this reason, there is a fear that the active principles with a hormonal action can be found in the slaughtered animals which can be absorbed by the consumer.

My copending, commonly assigned U.S. application Ser. No. 356,495, filed May 2, 1973 describes zootechnical compositions comprising an estrogenic steroid and an anabolic steroid.

OBJECTS OF THE INVENTION

It is an object of the invention to provide novel zootechnical compositions for increasing the weight of breeding animals.

It is another object of the invention to provide a novel method of increasing the weight and upgrading the meat of farm animals such as pigs and bovines.

These and other objects and advantages of the invention will become obvious from the following detailed description.

THE INVENTION

The novel zootechnical compositions are comprised of a mixture of an anabolisant steroid of the formula

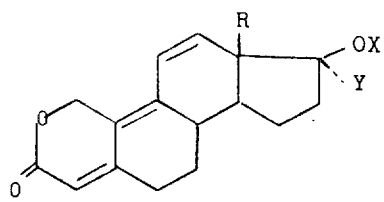

I wherein R is alkyl of 1 to 4 carbon atoms, Y is selected from the group consisting of hydrogen and saturated and unsaturated alkyl of 1 to 4 carbon atoms and X is selected from the group consisting of hydrogen, saturated and unsaturated alkyl of 1 to 6 carbon atoms, one of which may be replaced by an oxygen atom and acyl of an organic carboxylic acid of 1 to 18 carbon atoms and an estrogenic steroid of the formula

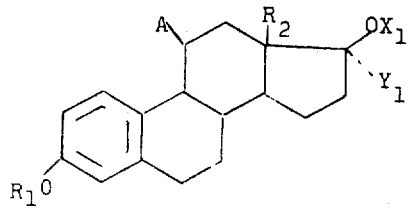

II wherein $R_2$ is alkyl of 1 to 4 carbon atoms, $R_1$ is selected from the group consisting of hydrogen, alkyl of 1 to 5 carbon atoms and cycloalkyl of 3 to 7 carbon atoms, A is selected from the group consisting of hydrogen and alkoxy of 1 to 4 carbon atoms, $X_1$ is selected from the group consisting of hydrogen, alkyl of 1 to 4 carbon atoms, acyl of an organic carboxylic acid of 1 to 10 carbon atoms and aliphatic and cyclanic carbonic acid of 1 to 10 carbon atoms and $Y^1$ is selected from the group consisting of hydrogen, methyl, ethynyl and haloethynyl.

Examples of suitable acids are alkanoic acids, such as formic acid, acetic acid, propionic acid, butyric acid, isobutyric acid, valeric acid, isovaleric acid, trimethyl acetic acid, caproic acid, β-trimethylpropionic acid, heptanoic acid, caprylic acid, pelargonic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenylacetic acid and phenylpropionic acid; aryl carboxylic acids such as benzoic acid and 2,4-dinitrobenzoic acid; phenoxy alkanoic acids such as phenoxyacetic acid, p-chlorophenoxy acetic acid, 2,4-dichlorophenoxy acetic acid, 4-tert.-butylphenoxy acetic acid, 3-phenoxy propionic acid and 4-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acids such as acetylacetic acid, propionylacetic acid and butyrylacetic acid; amino acids such as diethylaminoacetic acid and aspartic acid.

Among the preferred compounds of formula I are those where R is methyl or ethyl, X is hydrogen; saturated alkyl of 1 to 4 carbon atoms such as methyl, ethyl, propyl, isopropyl, butyl or isobutyl; saturated alkyl of 2 to 4 carbon atoms with an oxygen atom between 2 carbon atoms such as methoxymethyl; unsaturated aliphatic hydrocarbon of 2 to 6 carbon atoms such as 2-methylallyl or 3-methyl-2-butenyl or an acyl of an organic carboxylic acid of 1 to 10 carbon atoms; and Y is hydrogen or methyl.

Among the preferred compounds of formula II are those wherein $R_1$ is hydrogen or methyl; A is hydrogen or methoxy, $R_2$ is methyl or ethyl, $Y_1$ is hydrogen or methyl and $X_1$ is hydrogen or acyl of a lower alkanoic acid such as formic acid, acetic acid, propionic acid, butyric acid or isobutyric acid, a cycloalkanoic acid or cycloalkyl carboxylic acid such as cyclopropyl, cyclopentyl or cyclohexylacetic or propionic acids or cyclopropyl, cyclopentyl or cyclohexyl carboxylic acids or aromatic acids such as benzoic acid or phenylalkanoic acids such as phenylacetic acid or phenylpropionic acid.

Among the most preferred zootechnical compositions of the invention are the anabolisant steroids of formula I where R is ethyl and where X is hydrogen. The preferred anabolisant is 2-oxa-13$\beta$-ethyl-17$\alpha$-methyl-$\Delta^{4,9,11}$-gonatriene-17$\beta$-ol-3-one. The preferred estrogenic steroid of formula I is estradiol.

A preferred composition comprises a mixture of 2-oxa-13$\beta$-ethyl-17$\alpha$-methyl-$\Delta^{4,9,11}$-gonatriene-17$\beta$-ol-3-one as the anabolisant and estradiol as the estrogen in the form of an implant for placement under the skin of the animals. The compositions of the invention do not cause any hormonal disturbance in the animals being raised while permitting a rapid rise in weight and an improvement in the quanlity of meat.

The compositions of the invention are not capable of leaving hormonal products in the organs of the animals which effect could be harmful to the consumer. It is particularly useful to employ an estrogen with a structure analogous or identical to natural hormones to assure a more regular metabolism and a more complete elimination. At the time of slaughter the total disappearance of the active principle at the point of deposit is verified. Finally, the simultaneous presence of the 2 active principles reenforce the favorable action against the increase of one and the other so that the results is a sensibly greater weight gain.

The zootechnical compositions possess interesting pharmacological properties, namely anabolisant properties and particularly protidic anabolisant properties as can be seen from the examples. These properties make the compositions useful in veterinary medicine to increase the general organic resistance against aggressions of all sorts, for combatting loss of weight gain, emaciation, general organic troubles due to a senescence state and equally, as a side effect, for combatting infections, parasitic and nutritional maladies.

The novel method of increasing the weight of farm animals, particularly pigs and bovines, comprises administering to farm animals an effective amount of a composition of the invention consisting of an anabolisant steroid and an estrogenic steroid. The compositions are usually administered to cows, particularly calves, as an implant under the skin, preferably in the ear lobe or the skin folds near the ear. However, the compositions can also be deposited in the neck of the animal or the fessier muscle. Instead of implants, the compositions can be injected in the form of a suspension or solution. The implants, however, have the advantage that the resorption is slower but more complete.

The amount of the composition to be administered depends largely on the species of animal being treated and the method of administration. In the raising of cows, particularly calves, the compositions may contain 1 to 300 mg, preferably 25 to 200 mg, of a anabolisant steroid and 1 to 60 mg, preferably 10 to 50 mg, of an estrogenic steroid. The particular strength is largely dependent upon the intensity of the effect of each component of the implants desired.

The compounds of formula I may be prepared by the processes described in French Pat. No. 7091M; No. 7595M; No. 1,553,958; No. 1,584,704; No. 5422M and No. 2,093,780 and patents of addition No. 251 CAM; 256 CAM and 273 CAM. The steroids of formula II can be prepared by the processes described in French Pat. No. 1,514,122; No. 1,540,942 and No. 1,476,509.

In the following examples there are described several preferred embodiments to illustrate the invention. However, it should be understood that the invention is not intended to be limited to the specific embodiments.

EXAMPLE 1

An implant containing an estrogenic steroid and an anabolisant steroid was prepared from 70 mg of 2-oxa-13$\beta$-ethyl-17$\alpha$-methyl-$\Delta^{4,9,11}$-gonatriene-17$\beta$-ol-3-one and 20 mg of estradiol and sufficient excipient to make a of

EXAMPLE 2

Effect of Implants on Cattle

This test involved 2 groups of male Pie black calves with one group acting as the controls and the second group receiving implants containing 70 mg of 2-oxa-13$\beta$-ethyl-17$\alpha$-methyl-$\Delta^{4,9,11}$-gonatriene-17$\beta$-ol-3-one and 20 mg of estradiol. The implants were introduced in the conjunctive tissue at the base of the ear 33 days before slaughter with all the animals receiving the same quantity.

The results are reported in the following Table. The yield is the ratio of weight of the carcass to the total weight of the animal and consumption indice is the ratio of the weight of the feed given to the animal to the total weight gain. The carcasses were classified on the following criteria: conformation-values of 1 to 3 with 1 the maximum; color-values of 1 to 3 with 1 the maximum; and fatty state-values of 1 to 3 with 1 the maximum and determined the number of calves having each value.

TABLE

|  |  | Controls | Animals rearing implants |
|---|---|---|---|
| Starting weight in Kg | | 39.44 | 39.48 |
| Weight before implantation in Kg | | 78.57 | 78.50 |
| Weight gain before treatment in Kg | | 39.13 | 39.01 |
| Weight in Kg at slaughter | | 148 | 157.71 |
| Total weight gain in Kg | | 108.66 | 118.23 |
| Daily weight gain in Kg | | 0.906 | 0.985 |
| Weight in Kg of carcasses | | 92.71 | 99.28 |
| Yield | | 62.62 | 62.93 |
| Color | (1 | 5/14 | 6/14 |
|  | (2 | 9/14 | 8/14 |
|  | (3 | 0/14 | 0/14 |
| Conformation | (1 | 3/14 | 10/14 |
|  | (2 | 5/14 | 2/14 |
|  | (3 | 6/14 | 2/14 |
| Fatty state | (1 | 12/14 | 14/14 |
|  | (2 | 2/14 | 0/14 |
|  | (3 | 0/14 | 0/14 |
| Consumption indice | | 1.69 | 1.57 |

From the results of the above Table it can be seen that the treated animals, as compared to the controls, had a greater weight, a more elevated yield, better color, fatty state and conformation as well as a lower consumption indice.

EXAMPLE 3

Possible metaplasia modifications of the prostate of calves is provoked by administration of estrogens. 3 groups of immature male calves were used in the test with one group serving as controls receiving no implant (I), another group receiving an implant containing 20 mg of estradiol (II) and another receiving an implant of 20 mg of estradiol and 70 mg of 2-oxa-13β-methyl-17α-methyl-Δ$^{4,9,11}$-gonatriene-17β-ol-3-one (III). The implants were administered subcutaneously and the animals were slaughtered 90 days later.

Examination of the animals which received estradiol only (II) presented a pronounced prostatic metaplasia but the animals of group III did not show any prostatic metaplasia. The hormonal effects of estradiol were completely annuled.

Various modifications of the compositions and method of the invention may be made without departing from the spirit or scope thereof and it should be understood that the invention is to be limited only as defined in the appended claims.

I claim:

1. A zootechnical composition comprising a mixture of an anabolisant steroid of the formula

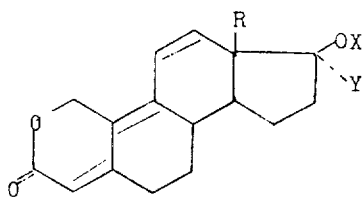

wherein R is alkyl of 1 to 4 carbon atoms, Y is selected from the group consisting of hydrogen and saturated and unsaturated alkyl of 1 to 4 carbon atoms and X is selected from the group consisting of hydrogen, saturated and unsaturated alkyl of 1 to 6 carbon atoms, one of which may be replaced by an oxygen atom and acyl of an organic carboxylic acid of 1 to 18 carbon atoms and an estrogenic steroid of the formula

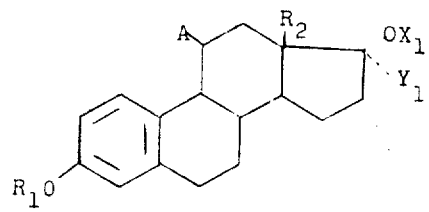

wherein $R_2$ is alkyl of 1 to 4 carbon atoms, $R_1$ is selected from the group consisting of hydrogen, alkyl of 1 to 5 carbon atoms and cycloalkyl of 3 to 7 carbon atoms, A is selected from the group consisting of hydrogen and alkoxy of 1 to 4 carbon atoms, $X_1$ is selected from the group consisting of hydrogen, alkyl of 1 to 4 carbon atoms, acyl of an organic carboxylic acid of 1 to 10 carbon atoms and aliphatic and cyclanic carbonic acid of 1 to 10 carbon atoms and $Y^1$ is selected from the group consisting of hydrogen, methyl, ethynyl and haloethynyl.

2. A composition of claim 1 wherein R is ethyl.

3. A composition of claim 1 wherein X is hydrogen.

4. A composition of claim 1 wherein the anabolisant steroid is 2-oxa-13β-ethyl-17α-methyl-Δ$^{4,9,11}$-gonatriene-17β-ol-3-one.

5. A composition of claim 1 wherein the estrogenic steroid is estradiol.

6. A zootechnical composition comprising 1 to 300 mg of 2-oxa-13β-ethyl-17α-methyl-Δ$^{4,9,11}$-gonatriene-17β-ol-3-one and 1 to 60 mg of estradiol.

7. A method of increasing the weight of farm animals comprising administering to farm animals a weight-increasing amount of a composition of claim 1.

8. The method of claim 7 wherein the farm animals are bovines and pigs.

9. The method of claim 7 wherein the anabolisant steroid is 2-oxa-13β-ethyl-17α-methyl-Δ$^{4,9,11}$-gonatriene-17β-ol-3-one and the estrogenic steroid is estradiol.

* * * * *